United States Patent [19]

Himeno et al.

[11] Patent Number: 4,738,116

[45] Date of Patent: Apr. 19, 1988

[54] APPARATUS FOR DEFLECTING THE DIRECTION OF THE WIND IN AN AIR CONDITIONER

[75] Inventors: Yasunori Himeno, Otsu; Naoki Shimokawa; Katsumi Fukuda, both of Shiga; Teruo Yamamoto, Yamatokoriyama, all of Japan

[73] Assignee: Matsushita Electric Industrial Co., Ltd., Osaka, Japan

[21] Appl. No.: 881,838

[22] Filed: Jul. 3, 1986

[30] Foreign Application Priority Data

Jul. 8, 1985 [JP] Japan .............................. 60-149519
Jul. 8, 1985 [JP] Japan .............................. 60-149523
Jul. 8, 1985 [JP] Japan .............................. 60-149524

[51] Int. Cl.⁴ .............................................. F25D 17/04
[52] U.S. Cl. ....................... 62/186; 98/121.2; 236/49
[58] Field of Search ................ 62/186; 98/42.09, 94.2, 98/40.27, 40.25, 40.3, 121.2; 236/49, 49 D

[56] References Cited

U.S. PATENT DOCUMENTS 3,257,931 6/1966 Lupton ................................ 98/40.3
3,298,298 1/1967 Yiwata ............................... 98/40.25
4,628,801 12/1986 Hashimoto ...................... 98/121.2 X Primary Examiner—William E. Wayner
Attorney, Agent, or Firm—Stevens, Davis, Miller & Mosher

[57] ABSTRACT

The present invention provides an air conditioner comprising, at a blowout port, a vertically deflecting vane and a group of the laterally deflecting vanes for respectively vertically and laterally deflecting the wind blown out from the blowout port. The group of the laterally deflecting vanes is partitioned with respect to the center of the blowout port into at least one rightwardly deflecting vane and at least one leftwardly deflecting vane, so that the rightwardly deflecting vane and the leftwardly deflecting vane can be individually operated. A drive means is controllably provided for individually driving the vertically deflecting vane and the group of laterally deflecting vanes, so that the wind blown out from said blowout port is changed in accordance with a temperature value to a mode in which the blowout wind is laterally split in a horizontal or upward direction, a mode in which it is concentrated in the horizontal or upward direction, a mode in which it is laterally split in a downward direction, and a mode in which it is concentrated in the downward direction.

32 Claims, 12 Drawing Sheets

F I G. 7C
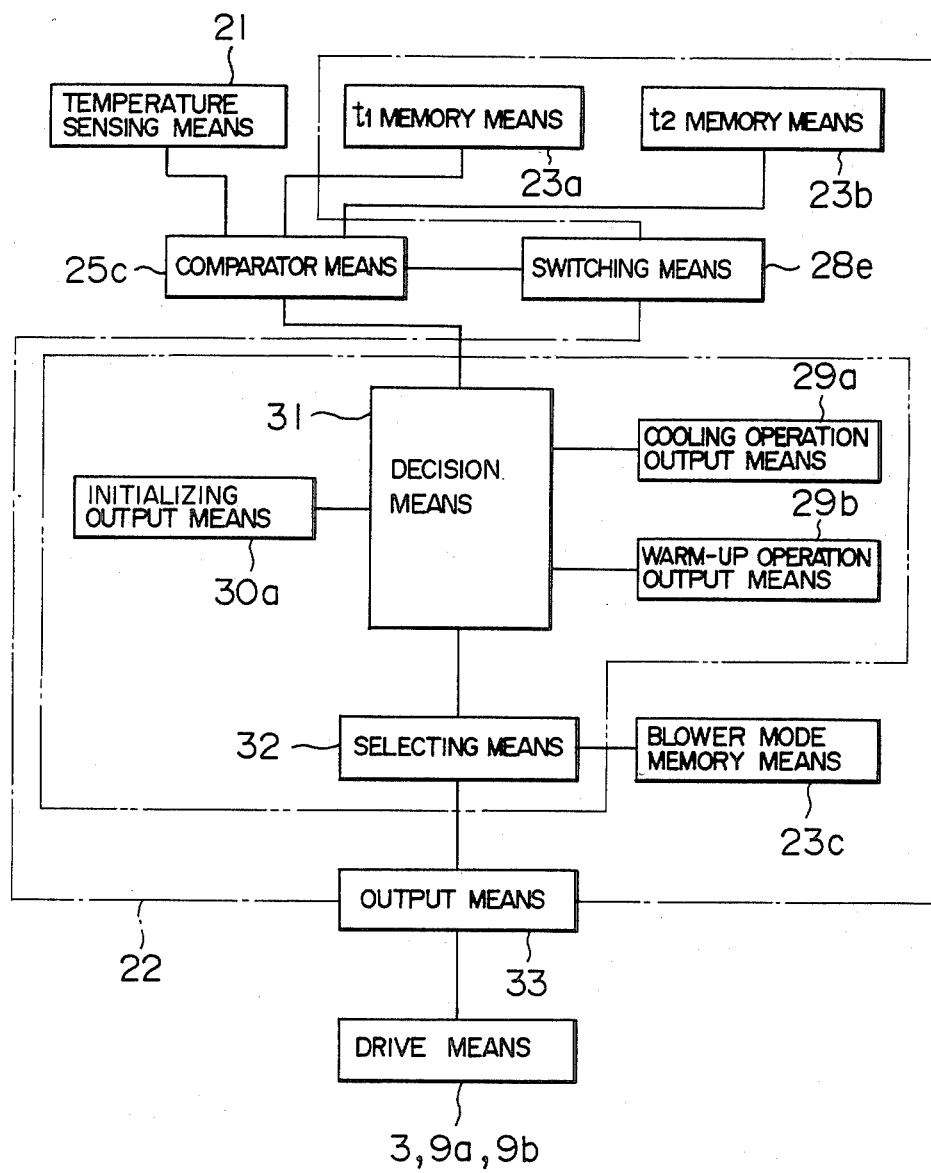

APPARATUS FOR DEFLECTING THE DIRECTION OF THE WIND IN AN AIR CONDITIONER

OBJECT OF THE INVENTION

An object of the present invention is to provide an apparatus for deflecting the wind direction which can not only deflect the wind direction from a blowout port of an air conditioner vertically as well as laterally, but also feed the wind in branched manner in the lateral direction, so that air conditioning can also be achieved around a human body to improve comfort.

Another object of the present invention is to construct a microcomputer control unit, so that the complicated control of the deflection of the wind direction can be automatically effected to improve the convenience of use.

A further object of the present invention is to perform an initialization from the time when the power switch is turned on, so that a reliable operation of the apparatus can be realized.

Another object of the present invention is to provide the air conditioning from the surroundings of the body together with air conditioning by direct feed of the wind depending on the sensed temperature, so that body comfort may be further improved.

BACKGROUND OF THE INVENTION

Conventionally, to improve the comfortableness of a living space, various apparatus have been conceived for deflecting the wind direction of an air conditioner.

For example, an apparatus is provided with a blowout port in the horizontal and vertical directions, wherein, when the blowout temperature is lower than the predetermined temperature, the wind is blown out in the horizontal direction, and in the opposite case, in the vertical direction. (See Japanese Patent Examined Publication No. 10813/1980.)

Figure 13:
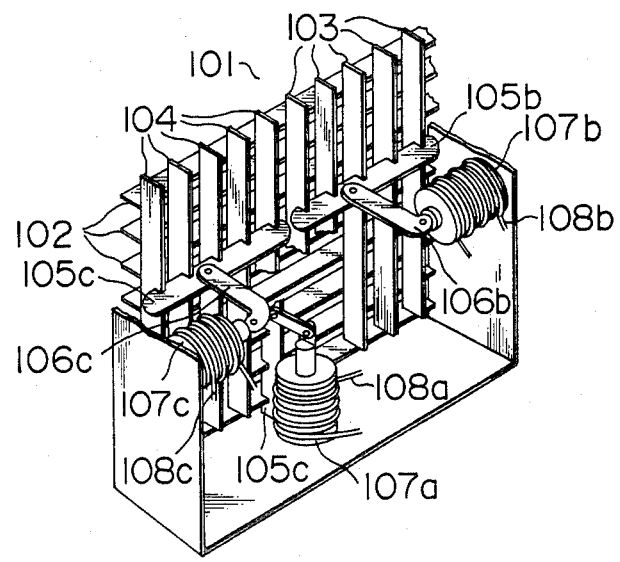
Figure 14:
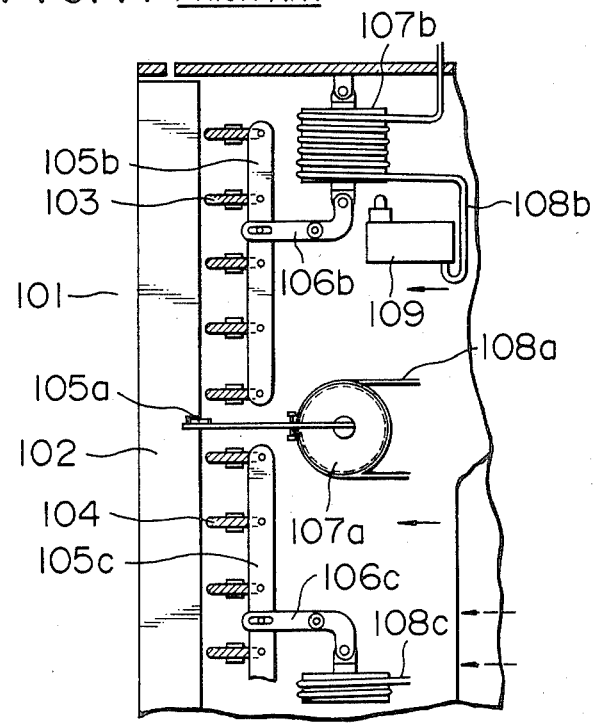

According to this first prior art, the so-called cold draft is prevented to raise the heating effect. Furthermore, to improve a comfortableness of the wide living space, there is proposed an apparatus for swinging the vanes for deflecting the wind direction laterally and vertically with a predetermined cycle (U.S. Pat. No. 3,257,931). This second prior art is shown respectively in FIGS. 13 and 14.

In the same figures, at the front surface portion of the blowout port 101, a vane 102 for vertically deflecting the blown out wind and vanes 103 and 104 for horizontally deflecting the blown air are provided. The vane 102 is connected via a connecting member 105a and a lever arm 106a to a bellows 107a. Furthermore, vanes 103 and 104 are connected via connecting members 105b and 105c and lever arms 106b and 106c to bellows 107b and 107c. Heaters 108a, 108b and 108c are respectively wound about each bellows 107a, 107b and 107c. Reference numeral 109 is a microswitch for controlling the electrical conduction of the heaters 108a, 108b and 108c.

In the above-described construction, heaters 108a, 108b and 108c are electrically conducted, so that bellows 107a, 107b and 107c may be expanded. The expansion of this bellows 107b operates the microswitch, stopping the electrical conduction to heaters 108a, 108b and 108c. As a result, bellows 107a, 107b and 107c are cooled and contracted. By the repetition of this operation, the fluctuating effect of the blown out air can be achieved.

However, according to the above-described first embodiment, since the deflection of the blown out air can be controlled only in the vertical direction, the cool wind during the heating, for example, can be prevented from striking directly against the human body, but since the air is blown out only in one direction (forwardly), the mobility of the air within the living space becomes greater, the body senses the temperature below the actual room temperature. Furthermore, since the downwardly blown out air strikes directly against the body, the blowout temperature must be raised sufficiently beforehand and, in particular, it requires a considerable time from the start of the operation of the air conditioner until the air is downwardly blown out, which delays the startup of heating.

Furthermore, though the apparatus according to the second embodiment allows the air to be blown out horizontally, since vanes are swung independently of the blowout temperature, the startup time cannot be shortened especially at the time of a warm up operation and the heating cannot be efficiently conducted.

PREFERRED EMBODIMENT OF THE INVENTION

The apparatus for deflecting the wind direction of the air conditioner according to the present invention is hereinafter described with reference to the appended drawings.

Figure 1:
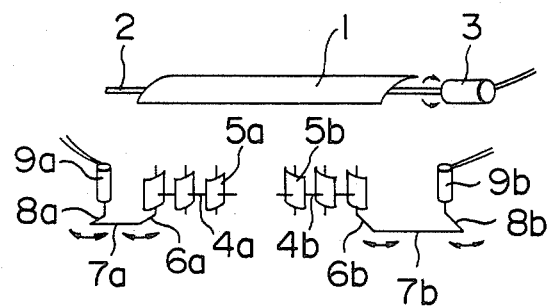
FIG. 1 shows a disassembled perspective view, illustrating one embodiment of an apparatus for deflecting the wind direction according to the present invention.

FIG. 1 shows a disassembled perspective view of the essential portion of the same apparatus. As shown in the figure, a vertically deflecting vane 1 which is slightly curved and which deflects the wind direction vertically by the Coanda effect has a shaft 2 extending in the longitudinal direction, which is connected to a first motor 3 (stepping motor). Laterally deflecting vanes consist of a leftwardly deflecting vane 5a which is connected to a connecting member 4a and a rightwardly deflecting vane 5b which is connected to a connecting member 4b. The leftwardly deflecting vane 5a is connected via a lever arm 6a for driving the vane, a rod 7a and a lever arm 8a for the motor to a second motor 9a (stepping motor) and the rightwardly deflecting vane 5b is connected via a lever arm 6b for driving the vane, rod 7b and a lever arm 8b for the motor to a third motor 9b (stepping motor). The leftwardly deflecting vane 5a is slightly curved such that it has a center at the left side thereof, while the rightwardly deflecting vane 5b is slightly curved such that it has a center at the right side thereof. This is for deflecting the wind direction by the Coanda effect produced by both side portions 13a and 13b of the blowout port 12. The description of the Coanda effect is omitted, since it belongs to a known art.

Figure 2:
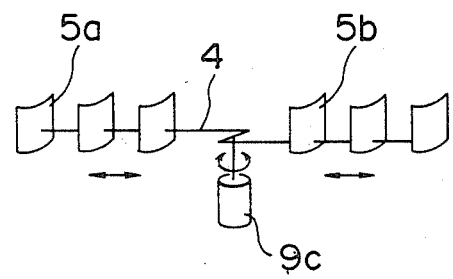
FIG. 2 shows a schematical view, illustrating the different connection of the vanes for deflecting the wind direction lateraly in the same apparatus.

In this embodiment, a drive means is composed of a first motor 3, second motor 9a and a third motor 9b, but, as shown in FIG. 2, the number of motors which drive laterally deflecting vanes may be one and, further, it is also possible to control the vertically deflecting motor 1 and the laterally deflecting vane by a single motor by using the switching means such as the gear, clutch or the like. And yet, the motor is not confined to a stepping motor, but an induction motor may be used.

Furthermore, in place of the motor, it can be conceived to use the spring made of the shape memory alloy the shape of which is varied depending on the ambient temperature. In this case, this alloy itself has a temperature sensing means and a set temperature memory means which are requisites to the present invention. Furthermore, the split of the laterally deflecting vanes into the leftwardly deflecting vane 5a and the rightwardly deflecting vane 5b is because it allows the concentrated split flow which is the object of the invention to be effected easily and allows the wind direction to be controlled individually. To effect the further delicate control of the wind direction, vanes are further split, or, on the contrary, without splitting them, as shown in FIG. 2, they may be connected by a single connecting member 4. Furthermore, the leftwardly deflecting vane 5a and the rightwardly deflecting vane 5b are curved to raise the concentration and split flow effect which is the object of the invention, as well as to deflect the wind direction by the Coanda effect. If the above described Coanda effect is not considered, they may be of a planar shape free of any curve, or further, the curved direction may be respectively inversed.

Figure 3:
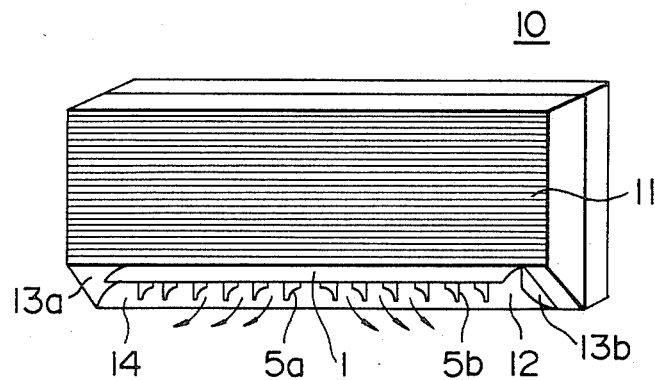
FIG. 3 shows a perspective view, illustrating an air conditioner equipped with the same apparatus.

Next, a perspective view of the indoor unit 10 in which the apparatus for deflecting the wind direction shown in FIG. 1 is attached is shown in FIG. 3.

In the same figure, a suction port 11 which sucks the air within the room is provided on the front surface of the indoor unit 10 and a blowout port 12 having the vertically deflecting vane and the laterally deflecting vanes 5a and 5b is provided at the lower portion of this suction port 11. Both side portions 13a and 13b of this blowout port 12 respectively form a curved surface expanding gradually toward the outer direction to deflect the wind direction, as described above, by virtue of the Coanda effect.

Figure 4:
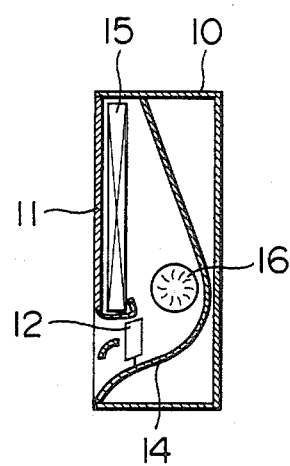
FIG. 4 shows a longitudinal cross sectional view of the same air conditioner.

A lateral cross sectional view of the indoor unit 10 is shown in FIG. 4. An indoor heat exchanger 15 is provided at the location opposed to the suction port 11 and a ventilator 16 is provided in the airway from this heat exchanger 15 to the blowout port 12.

Figure 5:
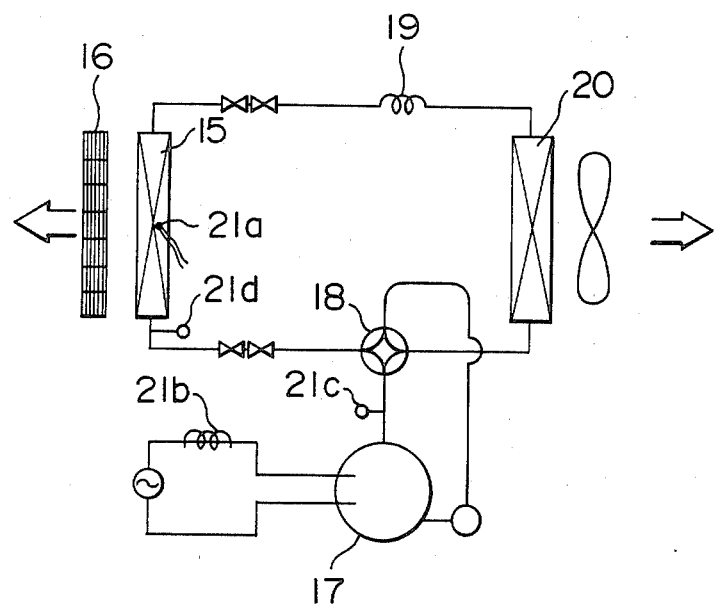
FIG. 5 shows a diagram of the refrigerating cycle of the same air conditioner.

Next, in FIG. 5, a compressor 17, four way valve 18, indoor heat exchanger 15, capillary tube 19, outdoor heat exchanger 20 are annularly connected. During the warm up, the coolant flows sequentially through the compressor 17, four-way valve 18, indoor heat exchanger 15, capillary tube 19, outdoor heat exchanger 20 and again returns to the compressor from four-way valve 18. Reference numerals 21a to 21b are means for indirectly sensing the temperature of the brown out air. Namely, reference numeral 21a is a temperature sensor for sensing the temperature of the tube of the indoor heat exchanger 15, 21b a current sensor for sensing the current of the compressor 17, 21c a pressure sensor for sensing the pressure of the discharge tube of the compressor 17, 21d a pressure sensor for sensing the pressure of the tube of the indoor heat exchanger 15. To sense the temperature of the blown out air, it can be conceived to provide the temperature sensor directly at the blowout port 12, but, it can be sensed also from the temperature (at the side of the heat source), pressure and the current at each of the above-mentioned parts and either of them may be selected or combined.

Figure 6:
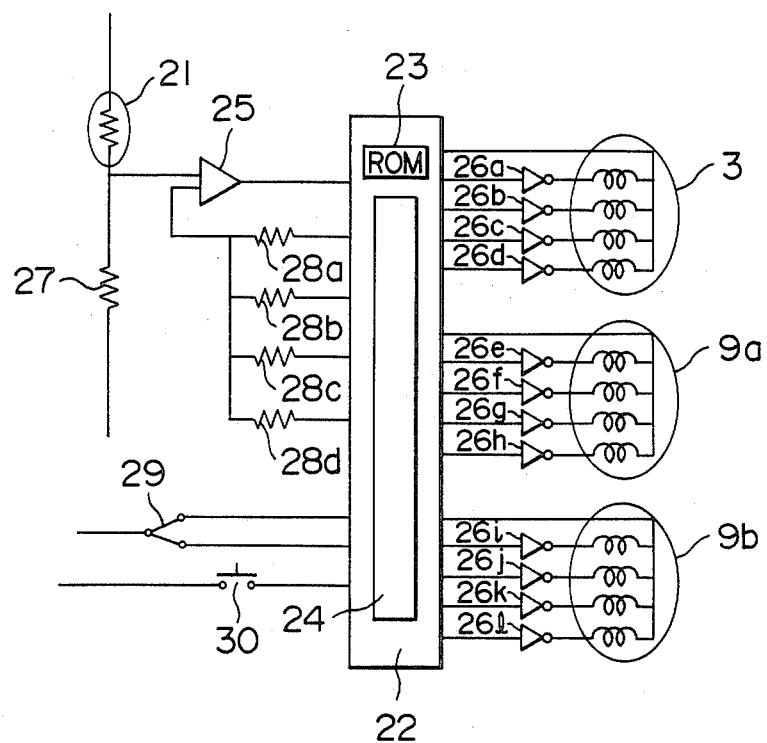
FIG. 6 shows a circuit diagram of the same air conditioner, FIGS. 7A, 7B and 7C respectively show a circuit diagram having different functions in the apparatus according to the present invention.

Next, the essential circuit diagram of the embodiment is shown in FIG. 6. In the same figure, within the microcomputer 22 are provided a memory 23 for storing the predetermined temperature and the blower modes or the like and a means for generating the drive signal 24 which generates the output signal, as the case may be, by the comparison of the input value with the predetermined value stored within this memory section. To the input of this microcomputer is connected a thermistor 21 for sensing the temperature via a comparator 25 and to the output are connected the first, second and third motors 3, 9a and 9b via buffers 26a to 26l which feed the pulse output to each motor 3, 9a and 9b. Hereby reference numeral 27 is a bias resistance and 28a to 28d are scan resistances. 29 shows a switch for switching the warm up operation to and from the cooling operation and 30 a power switch for turning on the power supply.

As known, the microcomputer 22 performs the control of the operation of the air conditioner, controlling the room temperature during the cooling and heating, feed of air, defrosting during the heating or the like.

The present invention relates to the control of the feed of the air. Therefore, assuming that the other control be known, the control of the feed of air is hereinafter described.

Figure 7A:
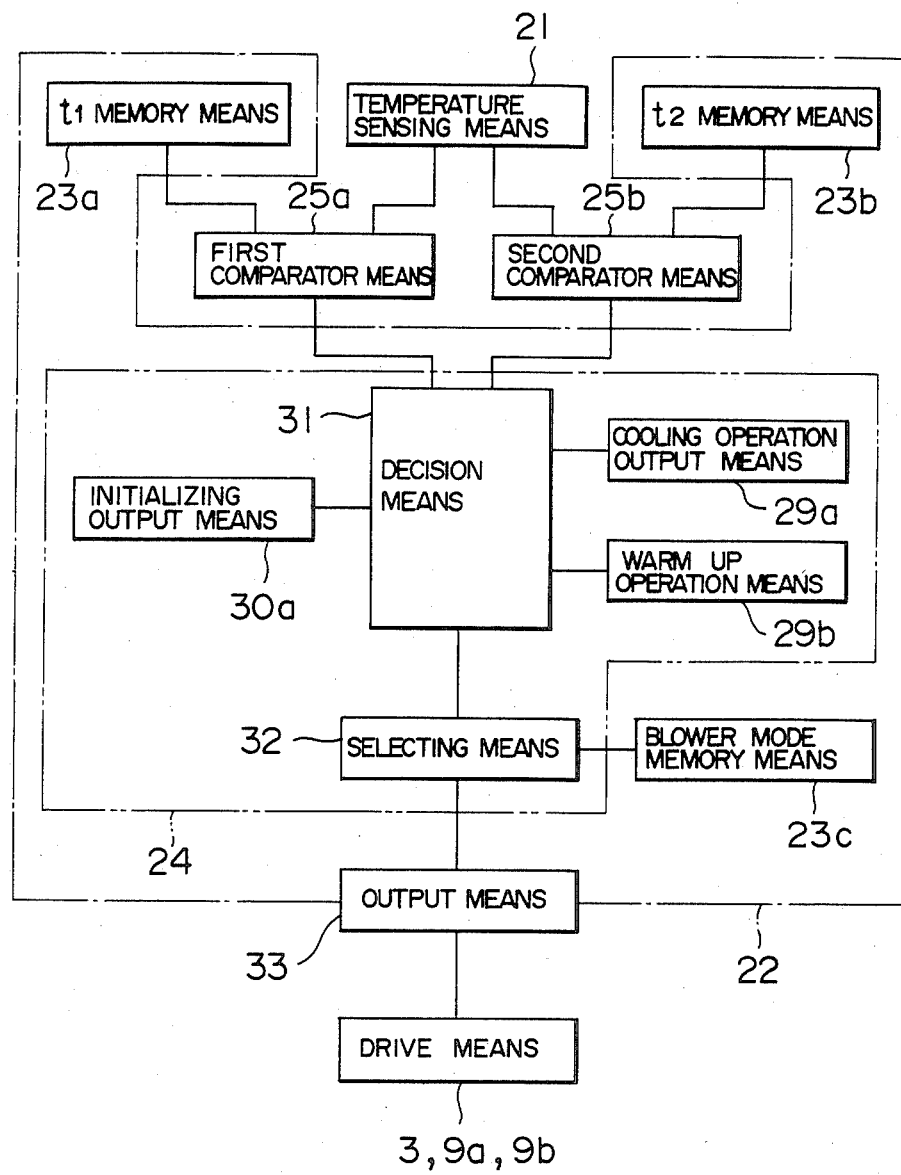

If the construction illustrated in FIG. 6 is illustrated in terms of the circuit, FIG. 7A is obtained.

In the same figure, reference numeral 23a is a t1 memory means for storing the first set value t1, 23b a t2 memory means for storing the second set value t2 which is higher than the above first one t1, 23c a blower mode memory means for storing a plurality of modes whereby the wind is deflected from the blowout port 12 and all of them constitute a memory section illustrated in FIG. 6. The above-mentioned blower mode memory means stores the first mode in which the wind blown out by the vertically deflecting vane 1, leftwardly deflecting vane 5a and rightwardly deflecting vane 5b is concentrated to a front surface in the horizontal or upward direction, a second mode in which the same wind is split laterally in the horizontal or upward direction, a third mode in which the wind is split laterally in the downward direction, and a fourth mode in which the wind is concentrated to the front surface in the downward direction. 25a is a first comparator means which compares the values of the sensed temperature t by the temperature sensing means 21 with the first set value t1 of the t1 memory means 23a and outputs the result, 25b a second comparator means which compares the value of the above sensed temperature t with the second set value t2 of the t2 memory means 23b and outputs the result. These first and second comparator means 25a and 25b respectively comprise the comparator 25 and scan resistances 28a to 28d illustrated in FIG. 6. Namely, the reference value of the comparator 25 is varied in accordance with the output state of the scan resistances 28a to 28d and it is compared in the switched manner with the first and second set values t1 and t2. 29a is an output means during the cooling operation, 29b an output means during the heating operation, outputting the value depending on which mode (cooling or heating) the switch 29 illustrated in FIG. 6 indicates. 30a is an initializing output means for controlling the vertically deflecting vane 1, leftwardly deflecting vane 5a and the rightwardly deflecting vane 5b, so that the first blower mode may be set and is operated each time the power switch illustrated in FIG. 6 is turned on. 31 is a decision means which decides whether the input signal is the output from the first 25a, or second 25b or cooling operation output means 29a or heating operation output means 29b or from the initializing output means 30a, outputting the corresponding signals. 32 is a selecting means which selects the blower mode corresponding to the output of the decision means 31 by the blower mode memory means 23c and outputs it. 33 is an output means which operates the drive means (first, second and third motors 3, 9a and 9b), so that the mode selected by the selecting means 32 may be set. In FIG. 6, this output means 33 is composed of the microcomputer 22 and the buffers 26a to 26l.

Though not distinctly divided, the one-dot chain line is composed of the microcomputer 22 illustrated in FIG. 6 and the two-dot chain line is composed of the drive signal generating means 24 therefor. Furthermore, the memory portion 23 comprises the t1 memory means 23a, t2 memory means 23b and the blower mode memory means 23c.

Figure 7B:
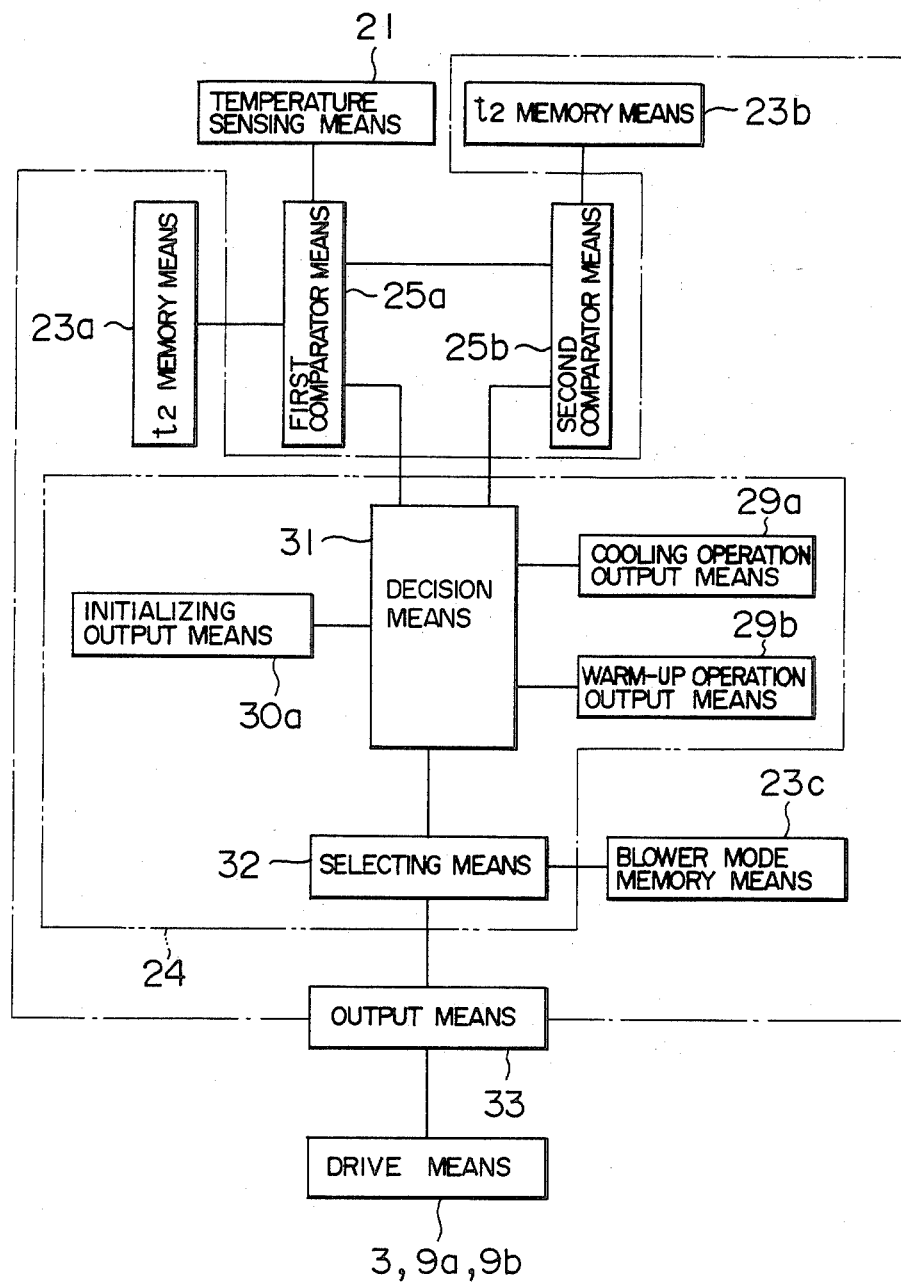

Though, in this embodiment, the second comparator means 25b is so designed as to compare the temperature t sensed by the temperature sensor 21 with the value t2 set by the t2 memory means 23b, as shown in FIG. 7B, the output of the first comparator means 25a may be compared with the set value t2. Furthermore, as shown in FIG. 7C, a single comparator means 25c may be provided and a comparator switching means 28e may be provided, so that the sensed temperature t may be mutually compared with the first and second set values t1 and t2.

Figure 8:
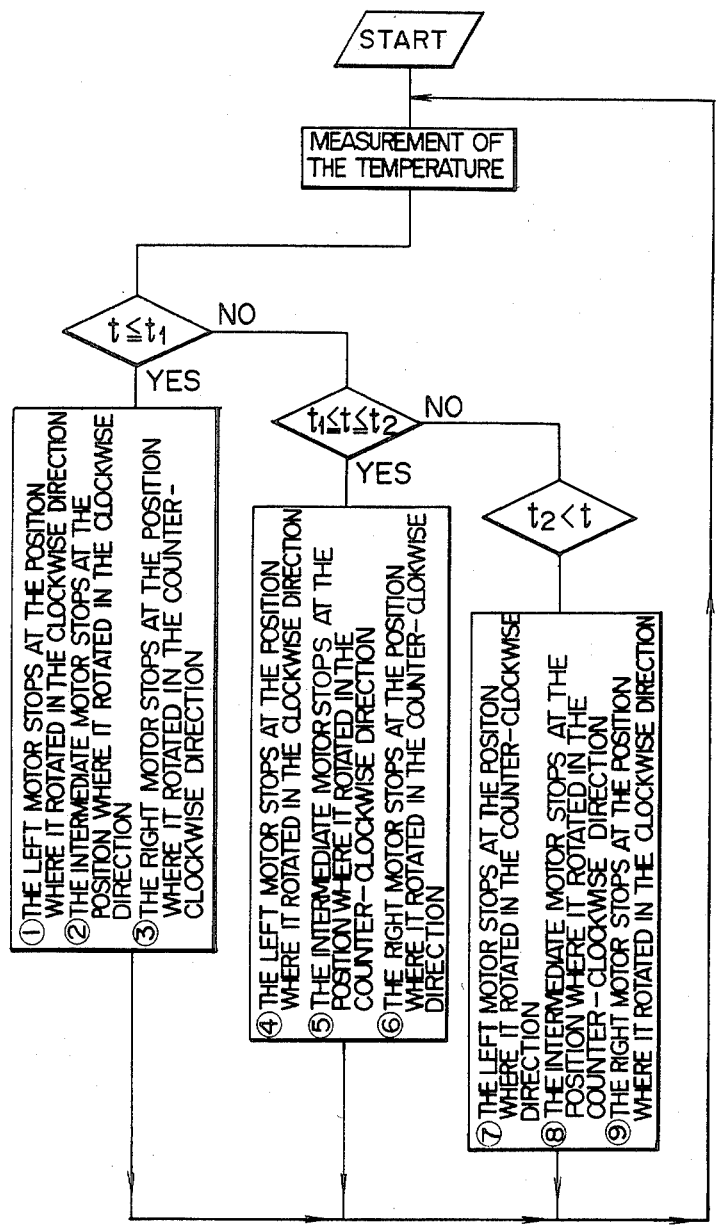
FIG. 8 shows a flow chart, schematically illustrating how the apparatus is controlled.
Figure 9:
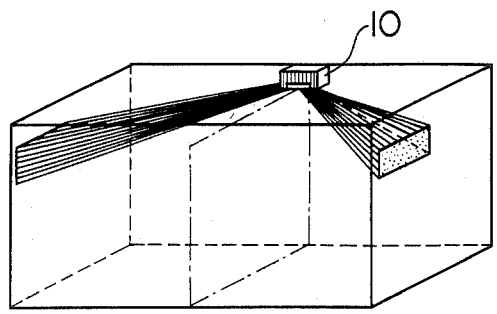
FIG. 9 shows an explanatory view, illustrating how the split flow is horizontally blown out in the same air conditioner.

Next, the operation of the present embodiment is schematically shown in FIG. 8. The same figure is a flow chart of the operation during the heating operation. The temperature of the blown out air is the temperature sensed by the thermistor 21 and t1 and t2 are the first and second set temperatures. If this temperature t is lower than the first temperature t1, the first motor 3 is rotated in the clockwise direction, second motor 9a is rotated in the clockwise direction, and the third motor 9b is rotated in the counterclockwise direction to stop the apparatus. In this case, the clockwise rotation of the first motor 3 means drives the vertically deflecting vane 1 in the horizontal position (as the case may be, to the upward position) the clockwise rotation of the second motor 9a means drives the leftwardly deflecting vane 5a to the left side, and the counterclockwise rotation of the third motor 9b means drives the rightwardly deflecting vane 5b to the right side. Namely, the blown out air is horizontally split, as shown in FIG. 9. Furthermore, in this case, the flow of the air need not be confined to be horizontally split, but it may be horizontally concentrated. In short, it is enough, that the wind not be downwardly fed.

Next, in case the temperature t sensed by the thermistor 21 is higher than the first set temperature t1 and below the second value t2, the first motor 3 is rotated in the counterclockwise direction to stop it. As a result, the blown out air becomes a downwardly split flow, as shown in FIG. 10.

Figure 10:
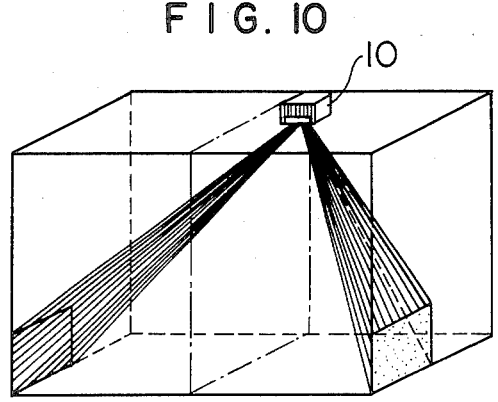
FIG. 10 shows an explanatory view, illustrating how the split flow is downwardly blown out in the same air conditioner.
Figure 11:
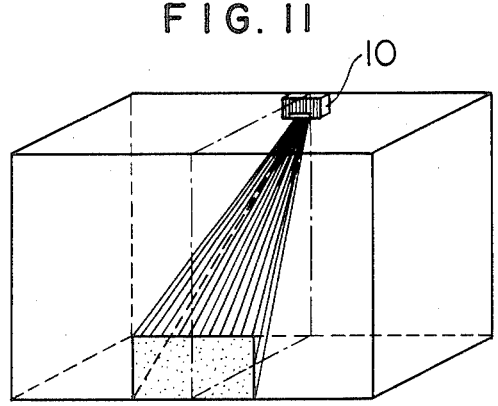
FIG. 11 shows an explanatory view, illustrating how the split flow is downwardly blown out in concentrated fashion, FIGS. 12A and 12B taken together show a detailed flow chart, illustrating how the same apparatus is controlled, FIGS. 13 and 14 respectively show a perspective view and a cross sectional view of the essential portion of the apparatus according to the prior art.
Figure 12A:
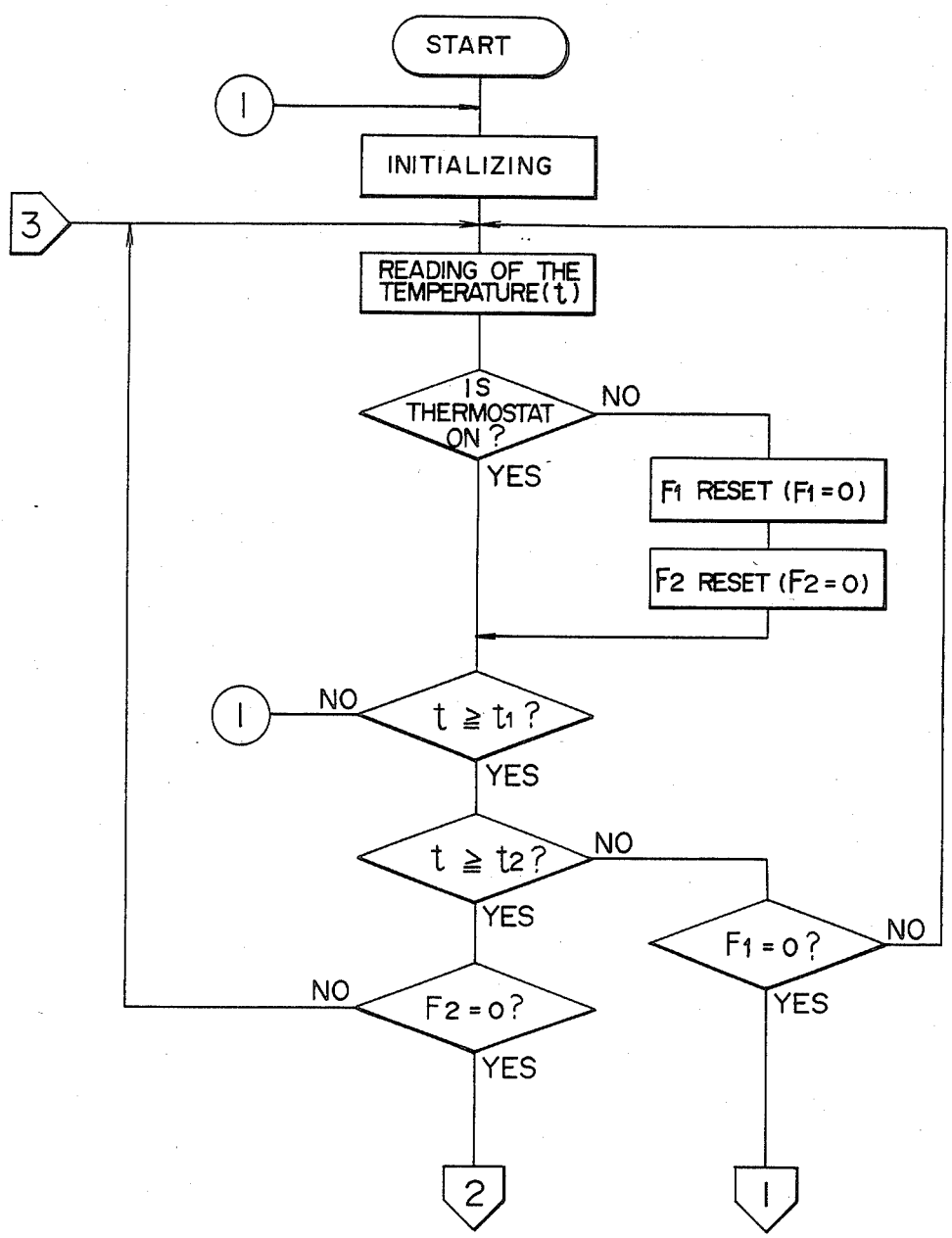
Figure 12B:
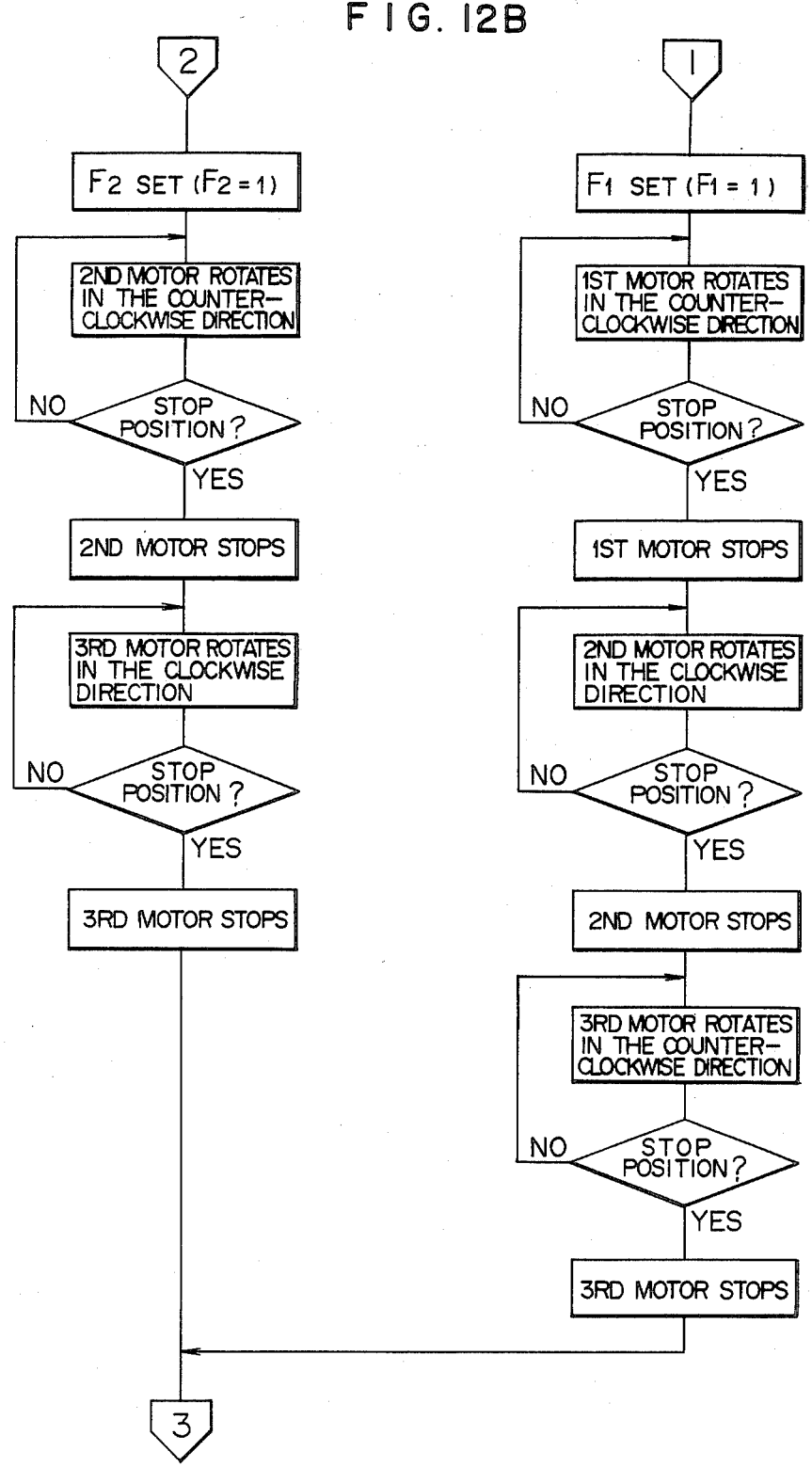

Next, in case the temperature t sensed by the thermistor 21 is higher than the second set temperature t2, referring to FIG. 10, the second motor 9a is rotated in the counterclockwise direction and the third motor 9b is rotated in the clockwise direction to stop them. As a result, the blown out air is downwardly concentrated, as shown in FIG. 11.

Thanks to the above-described operation, the insufficiently warm wind which is disagreeable to the body is turned into a horizontally split or horizontally concentrated flow during heating, so that it may not strike against the human body, and in case the blown out air is warmed to a certain extent, the air is downwardly split, so that it may strike indirectly against the human body, and in case the blowout temperature is sufficiently high, the air is downwardly concentratedly blown out, since the direct blow of the air against the body causes no discomfort.

Furthermore, in the variable capacity type air conditioner in which the r.p.m. of the compressor is controlled through a variable frequency control, in general, the capacity of the air conditioner is gradually made smaller as the room temperature draws near to the set temperature, but in this case, if the amount of the wind blown out from the indoor machine is constant, the blowout temperature is gradually decreased.

The effect obtained at the start of the heating operation thanks to such an operation is hereinafter described.

First, since the blowout temperature immediately after the start of the heating operation is low, it is not desirable to expose such air directly to the human body. Furthermore, even if it does not strike directly against the human body, since the high mobility of the air within the living space makes the body feel as if it were the temperature below the actual room temperature, the mobility of the air within the living space is preferred to be small from the standpoint of the comfortableness of the human body. Therefore, the horizontally split or horizontally concentrated blowout air makes it possible to be mixed only at the upper portion of the living space, heating the atmosphere without making the human body feel the coldness.

Then, when the blowout temperature has become high to a certain extent, since the flow of air is downwardly split, the heating action is performed from the periphery of the living space. Namely, even in this case, the mobility of the air within the living space can be made smaller, so that the heating can be effected without making the body feel the coldness. Furthermore, by first warming the surface of the wall, startup time can be shortened, while the temperature profile within the living space can be made uniform.

When the blowout temperature has become still higher, since the air is downwardly blown out in the concentrated manner, the warm wind can be exposed directly to the human body to thereby improve the heating effect. At this time, since the surface of the wall is also warmed to a certain extent, there will be no spots where the low temperature prevails within the living space.

Next, the effect obtained at the start of the cooling operation is described. First, since the blowout temperature immediately after the start of the cooling operation is high, to make the occupant feel the cool atmosphere as early as possible, the airflow is directly and downwardly blown out in the concentrated manner. If the blowout temperature is lowered with the operation time, its difference from the body becomes larger, which causes a discomfortable feeling to the occupant. Thus the cooling action is effected from the periphery of the living space by blowing out the air downwardly in split fashion, so that the cold wind may not be applied directly to the body, alleviating heat shock.

When the temperature of the blown out wind is further reduced, the air flow is horizontally split, so that the discomfortable feeling due to the cold wind may not be caused to the body, thus conditioning the air within the entire living space. This effect serves to make the occupant feel the coldness as early as possible, while subsequently conditioning the air within the entire living space and improving the comfortableness therein.

Next, referring to FIGS. 6, 7A to 7C and 12A to 12B, the operation of each deflecting vane 1, 5a, 5b during the heating operation, i.e. processing of the signals by the microcomputer is described in detail.

Hereby, for the convenience of description, it is assumed that the initialized state of each deflecting vane 1, 5a and 5b is set to the first mode stored in the blower mode memory means 23c, i.e. horizontally concentrated mode.

When the power switch 30 is turned on, the initializing output means outputs a signal and the decision means 31 decides this. As a result, the selecting means 32 selects the first mode from the blower mode memory means 23c, the initializing being effected. Consequently, the first motor is rotated in the clockwise direction to actuate the vertically deflecting vane 1, so that the air may be horizontally (upwardly) fed. Furthermore, the second motor 9a is rotated in the clockwise direction and the third motor 9b is rotated in the counterclockwise direction to offset the leftwardly deflecting vane 5a and the rightwardly deflecting vane 5b respectively to the center, so that the air may be centrally fed.

Then the temperature sensing means (thermistor) reads the temperature t and the first comparator means 25a compares it with the first set value t1 stored in the t2 memory means 23a. Since time is needed for the temperature t1 to reach the first set value t1, the initialized state continues for some time. When the temperature t1 has attained the first set value t1 in due course of time, the decision means 31 decides it to be a signal from the first comparator means 25a with the result that the selecting means 32 selects the third mode. Namely, since that temperature has not been elevated yet up to the second set value t2, processing at the side of the first routine 1 is conducted. Namely, in view of the first time routine 1, a flag F1 is set to 1 and the first motor 3 is rotated in the counterclockwise direction, stopping at the predetermined position, i.e. the air is downwardly fed. Then the second motor 9a is rotated, stopping at the predetermined position. In other words, the feed of air at the right half is deviated from the center. The above-described operation results in the blower mode shown in FIG. 10. If, with the lapse of time, the sensed temperature t has reached the second set value t2, the second comparator means 25b outputs the signal, while the deciding means decides this signal and outputs it. As a result, the selecting means 33 selects the fourth mode. Consequently, processing at the side of the routine of FIG. 12 is conducted.

Namely, in view of the first time routine 2, a flag F2 is set to 1 and the second motor 9a is rotated in the clockwise direction, stopping at the predetermined position. In other words, the leftwardly deflecting vane 5a is rotated toward the center and the feed of air at the left half is directed to the center (front surface).

Furthermore, the third motor 9b is rotated in the clockwise direction, stopping at the predetermined position. In other words, the rightwardly deflecting vane 5a is also rotated toward the center and the feed of air at the right half is directed to the center (front surface).

The vertically deflecting vane 1 maintains the current left state. Consequently, the air flow is downwardly concentrated to the front surface, as shown in FIG. 11. If the sensed temperature has reached the set room temperature, as known, the thermostat is turned off, stopping the heating operation. At that time, flags F1 and F2 are reset together, providing against the return.

If the air feed is continued at that state, the sensed temperature t is gradually lowered, drawing near to the set value t1. As a result, processing of the routine 1 is conducted, the air flow is fed as in FIG. 10 with the result that the insufficiently warmed wind is applied to the human body nor the disagreeable feeling is attended therewith.

The above-described control is similarly achieved in any of circuits illustrated in FIGS. 7A, 7B and 7C. Furthermore, the sequence in which first to third motors 3, 9a and 9b are driven is not confined to those illustrated in FIGS. 12A and 12B, but can be arbitrarily set. Furthermore, with reference to the cooling time, too, as described above, the control method is not confined to the sequential variation of the blower modes, but the first and second modes may be alternately repeated.

ADVANTAGES OF THE INVENTION

According to the present invention, as seen from the above description of the preferred embodiments, since, when the blowout temperature has attained a predetermined temperature, the air which is being blown out horizontally or upwardly is blown out downwardly in the split fashion, when the blowout temperature is low, the mixing action of the air is achieved only at the upper portion of the living space. Namely, since the mixing action of the air can be improved only at the upper portion of the living space and the remarkable mobility of the air at the lower portion of the living space, the body feels no coldness, nor the comfortable feeling is impaired especially during heating.

If the blowout temperature is somewhat higher during the heating operation, since the air flow is downwardly blown out in the split fashion, heating is conducted from the lower periphery of the living space, i.e. from the surface of the wall, thus unifying the temperature profile, while accelerating the startup of the heating effect. Furthermore, when the blowout temperature is elevated, the air flow can be downwardly concentrated, thereby to further improve warmed feeling.

Furthermore, during the cooling operation, in case the blowout temperature is high, the air can be downwardly blown out concentratedly. As a result, at the time of cooling operation, it becomes possible to make the occupant feel the coolness caused by the air flow as early as possible, and further, to offer the coolness free of any heat shock when the blowout temperature is lowered subsequent to the start of operation.

Furthermore, at the time of the cooling operation, in addition to the above-described control, when the air is fed horizontally or upwardly, the cool wind is laterally swung, which allows the uniform cooling effect to be obtained throughout the entire room.

Furthermore, in the variable capacity air conditioner wherein the r.p.m. of the compressor is controlled by the variation of the frequency, in general, the capacity is gradually decreased as the room temperature draws near to the set temperature. In this case, if the amount of the wind blown out from the indoor unit, the blowout temperature is gradually lowered. Namely, when the room temperature comes to be stable, the wind blown out from the air conditioner becomes disagreeably warm to the human body. Thus the air flow is downwardly blown out in the split fashion, so that it may not be directly exposed to the body. However, the downwardly blown out air, which dows not strike against the body, can offer the similar heating effect within the living room as in the downwardly and concentratedly blown out air. Namely, if heating is conducted from the periphery of the living space, the temperature profile within the living space can be made excellent to improve the comfortableness without making the layer of the warm air reside around the ceiling. Furthermore, when the blowout temperature has been further lowered, since the downwardly split air flow is turned into the horizontally (upwardly) split one, no cool wind travels the surface of the floor and without causing the coolness to the human body.

We claim:

1. An apparatus for deflecting the wind direction for use in an air conditioner comprising,
   a compressor for compressing a coolant, said compressor forming part of a refrigerating cycle together with an indoor heat exchanger and an outdoor heat exchanger,
   an indoor unit having a ventilator and said indoor heat exchanger therein,
   a blowout port provided within said indoor unit, which blows out air passing through said indoor heat exchanger,
   a movable vertically deflecting vane for vertically deflecting the air blown out from said blowout port,
   a group of movable laterally deflecting vanes which are provided laterally from the center of said blowout port for splitting the air blown out from said blowout port laterally or concentrating it to the center of said blowout port,
   a drive means for individually moving said vertically deflecting vane and said group of laterally deflecting vanes,
   a temperature sensing means for sensing the temperature at the side of the heat source such as the blowout temperature, and
   a control unit for controlling said drive means, so that the blower mode by said vertically deflecting vane and said group of laterally deflecting vanes may be set to any one of the following blower modes in accordance with the temperature sensed by said temperature sensing means: (1) a first mode in which the wind is discharged from said blowout port so that it is concentrated in one of a horizontal and upward direction, (2) a second mode in which the wind is discharged from said blowout port so that it is laterally split in one of a horizontal and upward direction, (3) a third mode in which the wind is discharged from said blowout port so that it is laterally split in a downward direction, and (4) a fourth mode in which the wind is discharged from said blowout port so that it is concentrated in a downward direction.

2. An apparatus for deflecting the wind direction for use in an air conditioner, as defined in claim 1, wherein said control unit comprises;
   a t1 memory means for storing a first set value,
   a t2 memory means for storing a second set value which is higher than said first value,
   a comparator means for comparing said sensed temperature with each set value stored within said t1 memory means and said t2 memory means and providing a resultant output,
   an initializing output means for outputting a signal after a power supply has been turned on,
   a heating operation signal outputting means for outputting a signal for instructing a heating operation,
   a cooling operation signal output means for outputting a signal for instructing a cooling operation,
   a deciding means for determining a blower mode in accordance with output signals from said comparator means, said initializing output means, said heating operation signal output means and said cooling operation signal output means,
   a blower mode memory means for storing signals defining said four blower modes,
   a selecting means for selecting one of said first to fourth modes in accordance with the output of said deciding means, and,
   an output means for making said drive means operate in accordance with the output from said selecting means, so that the wind from the blowout port may be set to the selected mode.

3. An apparatus for deflecting the wind direction for use in an air conditioner, as defined in claim 2, wherein, when a power switch is turned on, said initializing output means outputs a signal to actuate the drive means via the deciding means, the selecting means and the output means, so that the blower mode may be set to the first mode.

4. An apparatus for deflecting the wind direction for use in an air conditioner, as defined in claim 3, wherein, when the temperature sensed by the temperature sensing means has reached the first set value stored within the t1 memory means at the time of heating operation, the drive means is operated, so that the blower mode may be set to the third blower mode.

5. An apparatus for deflecting the wind direction, as defined in claim 4, wherein, when the temperature sensed by the temperature means has reached the second set value stored within the t2 memory means, the drive means is operated, so that the blower mode may be set to the fourth blower mode.

6. An apparatus for deflecting the wind direction for use in an air conditioner, as defined in claim 2, wherein, when the power switch is turned on, the initializing output means outputs a signal, and the drive means is operated via the decision means, selecting means and the output means, so that the blower mode is set to the second blower mode.

7. An apparatus for deflecting the wind direction for use in an air conditioner, as defined in claim 6, wherein, when the temperature sensed by the temperature sensing means has reached the first set value stored within the t1 memory means at the time of heating operation, the drive means is operated, so that the blower mode may be set to the third blower mode.

8. An apparatus for deflecting the wind direction for use in an air conditioner, as defined in claim 7, wherein, when the temperature sensed by the temperature sensing means has reached the second set value stored within the t2 memory means, the drive means is operated, so that the blower mode may be set to the fourth blower mode.

9. An apparatus for deflecting the wind direction for use in an air conditioner, as defined in claim 1, wherein said temperature sensing means is a temperature sensor for sensing the temperature of a tube of said indoor heat exchanger.

10. An apparatus for deflecting the wind direction for use in an air conditioner, as in claim 1, wherein said temperature sensing means is a temperature sensor for sensing the temperature of air which has been subjected to heat exchange in said indoor heat exchanger.

11. An apparatus for deflecting the wind direction for use in an air conditioner, as in claim 1, wherein said temperature sensing means is a current sensor for sensing electrical current through said compressor.

12. An apparatus for deflecting the wind direction for use in an air conditioner, as in claim 1, wherein said temperature sensing means is a pressure sensor for sensing fluid pressure within a discharge tube of said compressor.

13. An apparatus for deflecting the wind direction for use in an air conditioner, as in claim 1, wherein said temperature sensing means is a pressure sensor for sensing fluid pressure within a tube of said indoor heat exchanger.

14. An apparatus for deflecting the wind direction for use in an air conditioner comprising,
a compressor for compressing a coolant, said compressor forming part of a refrigerating cycle together with an indoor heat exchanger and an outdoor heat exchanger,
an indoor unit having a ventilator and said indoor heat exchanger therein,
a blowout port provided within said indoor unit, which blows out the air passing through said indoor heat exchanger,
a movable vertically deflecting vane for vertically deflecting the air blown out from said blowout port,
a group of movable laterally deflecting vanes which are provided laterally from the center of said blowout port for splitting the air blown out from said blowout port laterally or concentrating it to the center of said blowout port,
a drive means for individually moving said vertically deflecting vane and said group of laterally deflecting vanes,
a temperature sensing means for sensing the temperature at the side of the heat source such as the blowout temperature, and
a control unit for controlling said drive means, so that the blower mode by said vertically deflecting vane and said group of laterally deflecting vanes may be set to any one of the following blower modes in accordance with the temperature sensed by said temperature sensing means: (1) a first mode in which the wind is discharged from said blowout port so that it is concentrated in one of a horizontal and upward direction, (2) a second mode in which the wind is discharged from said blowout port so that it is laterally split in one of a horizontal and upward direction, (3) a third mode in which the wind is discharged from said blowout port so that it is laterally split in a downward direction, and (4) a fourth mode in which the wind is discharged from said blowout port so that it is concentrated in a downward direction, and,
said group of laterally deflecting vanes being composed of at least one leftwardly deflecting vane and at least one rightwardly deflecting vane, which are operated independently of each other, and further, said drive means being composed of a first motor which rotates said vertically deflecting vane to a predetermined extent in the clockwise or counterclockwise direction, a second motor which rotates said leftwardly deflecting vane to a predetermined extent in the clockwise or counterclockwise direction, and a third motor which rotates said rightwardly deflecting vane within a predetermined extent in the clockwise or counterclockwise direction.

15. An apparatus for deflecting the wind direction as defined in claim 14, wherein said control unit comprises a t1 memory means for storing a first set value, a t2 memory means for storing a second set value which is higher than said first set value, a comparator means which compares set values stored by said t1 memory means and t2 memory means with said sensed temperature and outputs a signal representing the result of the comparison, an initializing output means for outputting a signal after a power supply has been turned on, a heating operation signal output means for outputting a signal instructing a heating operation, a cooling operation signal outputting means for outputting a signal for instructing a cooling operation, a decision means for determining a blower output mode in accordance with output signals from said comparator means, said initializing output means, said heating operation signal output means, and said cooling operation signal means, a blower mode memory means for storing signals representing said blower modes, a selecting means for selecting one of said first to fourth blower modes in accordance with the result decided by said deciding means, and an output means for operating each of the first to third motors, so that the wind from the blowout port may be set to the selected blower mode.

16. An apparatus for deflecting the wind direction for use in an air conditioner, as defined in claim 15, wherein, when the power switch is turned on, the initializing output means outputs its signal, so that each of the first to third motors may be operated via the deciding means, selecting means and the output means.

17. An apparatus for deflecting the wind direction for use in an air conditioner, as defined in claim 16, wherein, when the temperature sensed by the temperature sensing means has reached the first set value stored within the t1 memory means at the time of heating operation, each of the first and second motors may be operated, so that the mode is set to the third mode.

18. An apparatus for deflecting the wind direction, as defined in claim 17, wherein, when the temperature sensed by the temperature sensing means has reached the second set value stored within the t2 memory means, each of the second and third motors is operated so that the mode is set to the fourth mode.

19. An apparatus for deflecting the wind direction for use in an air conditioner, as defined in claim 15, wherein, when the power switch is turned on, the initializing output means outputs its signal and each of the first to third motors is operated via the deciding means, selecting means and the output means, so that the blower mode may be set to the second mode.

20. An apparatus for deflecting the wind direction for use in an air conditioner, as defined in claim 19, wherein, when the temperature sensed by the temperature sensing means has reached the first set value stored within the t1 memory means, each of the first and third motors is operated, so that the blower mode may be set to the third mode.

21. An apparatus for deflecting the wind direction for use in an air conditioner, as defined in claim 20, wherein, when the temperature sensed by the temperature sensing means has reached the second set value, each of the second and third motors is operated, so that the blower mode may be set to the fourth mode.

22. An apparatus for deflecting the wind direction for use in an air conditioner, as defined in claim 14, wherein said temperature sensing means is a temperature sensor for sensing the temperature of a tube of said indoor heat exchanger.

23. An apparatus for deflecting the wind direction for use in an air conditioner, as in claim 14, wherein said temperature sensing means is a temperature sensor for sensing the temperature of air which has been subjected to heat exchange in said indoor heat exchanger.

24. An apparatus for deflecting the wind direction for use in an air conditioner, as in claim 14, wherein said temperature sensing means is a current sensor for sensing electrical current through said compressor.

25. An apparatus for deflecting the wind direction for use in an air conditioner, as in claim 14, wherein said temperature sensing means is a pressure sensor for sensing fluid pressure within a discharge tube of said compressor.

26. An apparatus for deflecting the wind direction for use in an air conditioner, as in claim 14, wherein said temperature sensing means is a pressure sensor for sensing fluid pressure within a tube of said indoor heat exchanger.

27. An apparatus for deflecting the wind direction for use in an air conditioner, comprising:
a compressor for compressing a coolant, said compressor forming part of a refrigerating cycle together with an indoor heat exchanger and an outdoor heat exchanger,
an indoor unit having a ventilator and said indoor heat exchanger therein,
a blowout port which is provided within said indoor unit and which blows out the air passing through said indoor heat exchanger,
a vertically deflecting vane for vertically deflecting the wind blown out from said blowout port,
a leftwardly deflecting vane for leftwardly deflecting wind blown out from said blowout port from its center,
a rightwardly deflecting vane for rightwardly deflecting wind blown out from said blowout port from its center,
a first motor for rotating said vertically deflecting vane in the clockwise or counterclockwise direction to a predetermined angular extent,
a second motor for rotating the leftwardly deflecting vane in the clockwise or counterclockwise direction to a predetermined angular extent,
a third motor for rotating said rightwardly deflecting vane in the clockwise or counterclockwise direction to a predetermined angular extent,
a temperature sensing means for sensing the temperature at the side of the heat source such as the blowout temperature,
a control unit for controlling each of the first to third motors in accordance with the temperature sensed by said temperature sensing means, so that the wind blown out by said vertically deflecting vane, leftwardly deflecting vane and rightwardly deflecting vane may be set to any of the following blower modes: (1) a first mode in which the wind is concentrated in one of a horizontal and upward direction, (2) a second mode in which the wind is laterally split in one of a horizontal and upward direction, (3) a third mode in which the wind is laterally split in a downward direction, and (4) a fourth mode in which the wind is concentrated in the downward direction, said control unit being composed of a t1 memory means for storing a first set value, a t2 memory means for storing a second set value which is higher than said first set value, a comparator means for comparing said sensed temperature with each of set values stored within the t1 memory means and t2 memory means, an initializing output means for outputting a signal after a power supply has been turned on, a heating operation signal output means for outputting a signal instructing a heating operation, a cooling operation signal output means for outputting a signal instructing a cooling operation, a deciding means for determining one of said blower modes in accordance with the output of the comparator means, the initializing means, the heating operation signal output means, and the cooling operation signal output means, a blower mode memory means for storing signals representing said first, second, third and fourth blower modes, a selecting means for selecting one of said first to fourth modes in accordance with the result decided by said deciding means, and an output means for operating each of said first to third motors in accordance with the output from said selecting means, and, further, when the temperature sensed by the temperature sensing means has reached the first set value stored within the t1 memory means at the time of heating operation, the blower mode being set to the third blower mode, when the temperature sensed by the temperature sensing means has reached the second set value stored within the t1 memory means, the blower mode being set to the fourth blower mode and further, the blower mode at the time of the cooling operation being set such that said first and second modes are alternately repeated.

28. An apparatus for deflecting the wind direction for use in an air conditioner, as defined in claim 27, wherein said temperature sensing means is a temperature sensor for sensing the temperature of a tube of said indoor heat exchanger.

29. An apparatus for deflecting the wind direction for use in an air conditioner, as in claim 27, wherein said temperature sensing means is a temperature sensor for sensing the temperature of air which has been subjected to heat exchange in said indoor heat exchanger.

30. An apparatus for deflecting the wind direction for use in an air conditioner, as in claim 27, wherein said temperature sensing means is a current sensor for sensing electrical current through said compressor.

31. An apparatus for deflecting the wind direction for use in an air conditioner, as in claim 27, wherein said temperature sensing means is a pressure sensor for sensing fluid pressure within a discharge tube of said compressor.

32. An apparatus for deflecting the wind direction for use in an air conditioner, as in claim 27, wherein said temperature sensing means is a pressure sensor for sensing fluid pressure within a tube of said indoor heat exchanger.

* * * * *